(12) United States Patent
Yasuoka et al.

(10) Patent No.: US 6,645,672 B2
(45) Date of Patent: Nov. 11, 2003

(54) ALKALINE STORAGE BATTERY AND METHOD FOR MANUFACTURING THE SAME

(75) Inventors: Shigekazu Yasuoka, Kasai (JP); Yoshinori Yokoyama, Takasago (JP); Atsumu Imasato, Sumoto (JP); Takaaki Ikemachi, Tsuna-gun (JP)

(73) Assignee: Sanyo Electric Co., Ltd., Osaka (JP)

(*) Notice: Subject to any disclaimer, the term of this patent is extended or adjusted under 35 U.S.C. 154(b) by 262 days.

(21) Appl. No.: 09/817,063

(22) Filed: Mar. 27, 2001

(65) Prior Publication Data
US 2001/0044049 A1 Nov. 22, 2001

(30) Foreign Application Priority Data
Mar. 30, 2000 (JP) ......................... 2000-093375

(51) Int. Cl.$^7$ .............. H01M 10/26; H01M 10/28; H01M 4/26; H01M 4/32
(52) U.S. Cl. .................. 429/223; 429/206; 429/235; 29/623.1
(58) Field of Search .................. 429/223, 233, 429/218.1, 206, 207, 235; 29/623.1; 252/182.1

(56) References Cited

U.S. PATENT DOCUMENTS

| 5,466,543 A | * 11/1995 | Ikoma et al. ............... 429/59 |
| 6,013,390 A | 1/2000 | Kimiya et al. |
| 6,156,454 A | 12/2000 | Bernard et al. |

FOREIGN PATENT DOCUMENTS

| EP | 0 863 562 | 9/1998 |
| EP | 0 869 565 | 10/1998 |
| JP | 2604282 | 1/1997 |
| JP | 200-133302 | 12/2000 |

* cited by examiner

Primary Examiner—Patrick Ryan
Assistant Examiner—Tracy Dove
(74) Attorney, Agent, or Firm—Nixon & Vanderhye P.C.

(57) ABSTRACT

The present invention provides an alkaline storage battery excellent in both charge properties and discharge properties. A novel alkaline storage battery is provided comprising an active positive electrode material containing nickel hydroxide as a main component and an alkaline electrolyte containing at least $Li^+$ and $Na^+$, characterized in that the positive electrode contains Y and/or Y compound and the alkaline electrolyte has an $Li^+$ content of from not lower than 0.1 to less than 1.0 N and an $Na^+$ content of from 0.3 to 1.5 N.

8 Claims, 3 Drawing Sheets

ALKALINE STORAGE BATTERY AND METHOD FOR MANUFACTURING THE SAME

BACKGROUND OF THE INVENTION

1. Field of the Invention

The present invention relates to an alkaline storage battery and more particularly to an alkaline storage battery having improved charge-discharge properties.

2. Description of the Related Art

Various approaches have been proposed to improve the charge-discharge properties of alkaline storage batteries at high temperatures.

For example, it is effective to incorporate Cd in a Ni positive electrode or increase the amount of Co to be incorporated in the Ni positive electrode. However, the former approach is disadvantageous in that it is subjected to regulations on the use of Cd from the standpoint of recent environmental protection. The latter approach is disadvantageous in that it lowers the packing of active material and hence the battery capacity.

There has been proposed an approach which comprises incorporating Li and Na in the alkaline electrolyte for nickel hydride battery to improve the charge-discharge properties thereof (see Japanese Patent 2,604,282).

However, the above cited patent is disadvantageous in that since the concentration of Li in the electrolyte is 1 N or more, the depth (degree) of charging is great, resulting in the production of γNiOOH that causes the expansion of the volume of the positive electrode and thus lowers the discharge voltage and capacity. On the contrary, when the content of Li is decreased, the deterioration of the discharge properties can be prevented, but the insufficiency in the content of Li makes it difficult to obtain desired charge properties.

Y (yttrium) is known as an element for improving the high temperature charge-discharge properties. Accordingly, it has been proposed that it has been proposed that Y be applied to the surface of an active material layer formed by filling a non-sintered substrate such as foamed porous material with an active positive electrode material to form a Y coat layer thereon.

However, this proposal is disadvantageous in that Y cannot be attached uniformly to the entire positive electrode including the substrate, making it impossible to allow Y to exert a sufficient effect of improving the high temperature charge properties.

SUMMARY OF THE INVENTION

The present invention has been worked out to solve the foregoing problems. It is therefore an object of the present invention to provide an alkaline storage battery which exhibits excellent charge properties as well as desired discharge properties.

The foregoing object of the present invention can be accomplished with an alkaline storage battery comprising an active positive electrode material containing nickel hydroxide as a main component and an alkaline electrolyte containing at least $Li^+$ and $Na^+$, characterized in that said positive electrode contains Y and/or Y compound and said alkaline electrolyte has an Li content of from not lower than 0.1 to less than 1.0 N and an $Na^\pm$ content of from 0.3 to 1.5 N (N: normality).

Preferably, said positive electrode comprises Y and/or Y compound on a surface of an active positive electrode material layer comprising said active positive electrode material, which is formed on a substrate.

In some detail, the alkaline storage battery comprises as a positive electrode a porous Ni sintered substrate filled with an active material containing nickel hydroxide. Y and/or Y compound is attached to the entire positive electrode including the substrate and active material. The concentration of the alkaline electrolyte is adjusted such that the content of Li ranges from not lower than 0.1 N to less than 1.0 N and the content of Na ranges from 0.3 N to 1.5 N.

The preparation of the positive electrode is preferably accomplished by a process which comprises filling a porous Ni sintered substrate with an active material containing nickel hydroxide, dipping the substrate in a mixed salt solution containing Y, and then subjecting the substrate to alkali treatment.

Y acts to improve the high temperature charge properties.

In the present invention, the positive electrode comprises a sintered substrate. In some detail, the positive electrode is prepared by filling the substrate with an active material, and then dipping the substrate in a mixed salt containing yttrium (e.g., yttrium nitrate-nickel solution). In this dipping process, Y is attached almost uniformly to the entire positive electrode including the substrate and active material in the form of yttrium hydroxide so that a Y coat layer is formed over the entire positive electrode, making it possible to exert excellent high temperature charge properties even if the content of Y is small.

Accordingly, even when the concentration of Li in the alkaline electrolyte falls below 1 N, the presence of the Y coat layer formed attached to the entire positive electrode makes it possible to provide excellent high temperature charge properties.

Further said positive electrode is formed by a process which comprises a dipping step of dipping a sintered nickel electrode in a salt containing yttrium and nickel so that it is filled with yttrium and an activating step of dipping said electrode in an aqueous solution of alkali.

BRIEF DESCRIPTION OF THE DRAWINGS

By way of example and to make the description more clear, reference is made to the accompanying drawings in which.

DETAILED DESCRIPTION OF THE PREFERRED EMBODIMENTS

Figure 1:
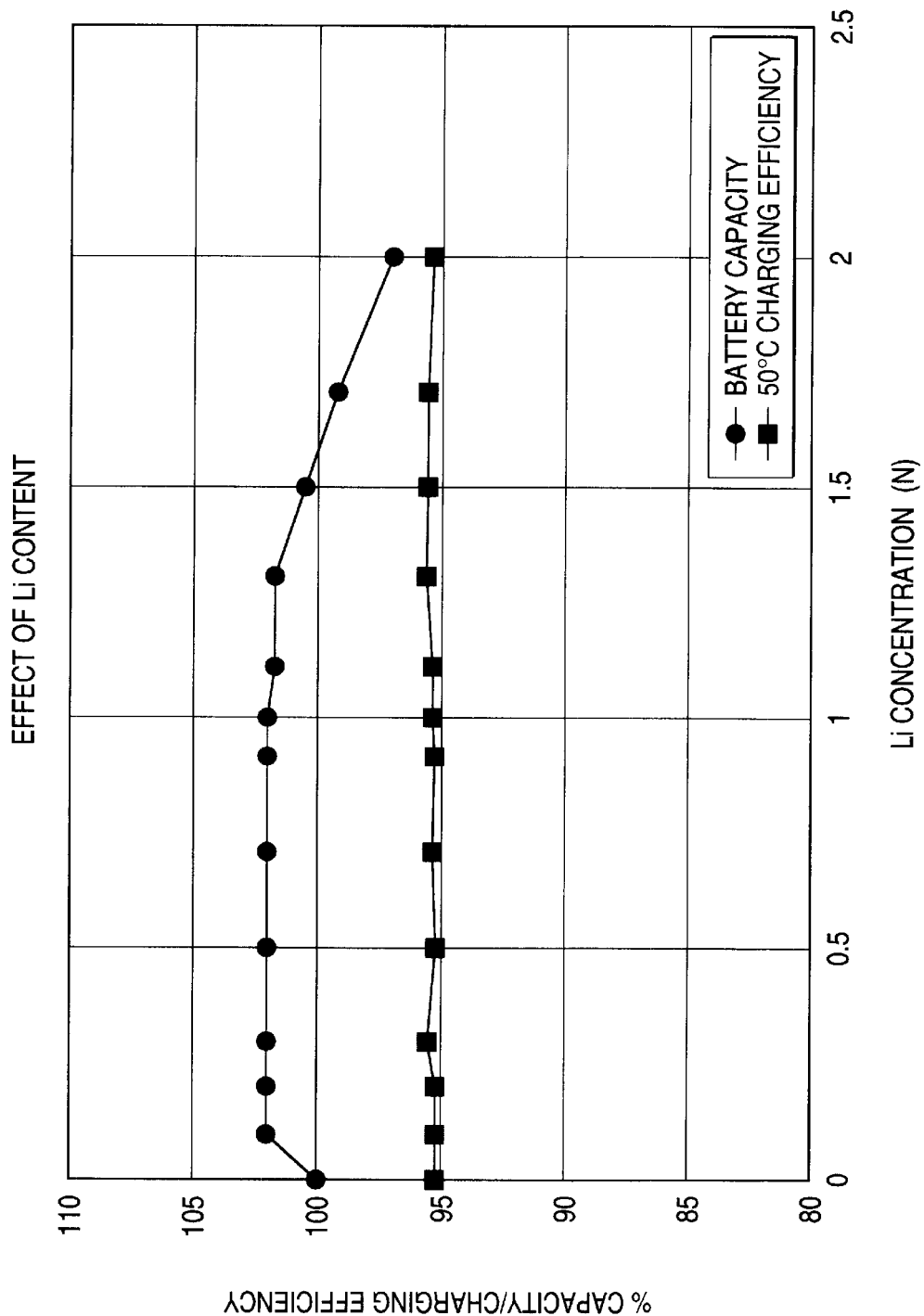
FIG. 1 is a graph illustrating the relationship between the concentration of $Li^+$ in an electrolyte and the capacity and 50° C. charging efficiency of a battery.

The alkaline storage battery according to the invention comprises a positive electrode, a negative electrode, a separator and an alkaline electrolyte. Typical examples of such an alkaline storage battery include nickel-hydride battery, nickel-cadmium battery, and nickel-zinc battery.

The positive electrode is prepared from a sintered substrate. As well known, this sintered Ni positive electrode is prepared by a process which comprises sintering a porous substrate, filling the substrate with an active material, and then subjecting the substrate to formation. In some detail, a slurry of nickel powder is applied to a nickel-plated iron substrate. The substrate is then sintered to prepare a porous sintered substrate. The sintered substrate thus obtained is then dipped in an aqueous solution of nickel nitrate or other active material-forming salts so that the pores in the substrate are filled with an active material mainly composed of nickel hydroxide. The substrate is then subjected to charging and discharging in an aqueous solution of alkali so that nickel hydroxide is electrochemically activated. Thus, the positive electrode of the invention is prepared. As the active material-forming salt there may be also used nickel nitrate having Co, Cd, Zn, etc. added thereto.

In accordance with the present invention, this sintered Ni positive electrode is dipped in a solution of yttrium nitrate-nickel salt so that the positive electrode including the substrate and active material is entirely filled with yttrium, dipped in an aqueous solution of alkali, cleaned, and then dried. In this manner, a sintered Ni positive electrode comprising yttrium hydroxide attached to the entire positive electrode including the substrate and active material is obtained.

Y may be used either in the form of simple body or in the form of compound. In practice, however, Y is present in the form of compound, i.e., yttrium hydroxide.

The content of Y is preferably from 0.1 to 5% by weight based on the weight of the positive electrode including the substrate.

When the content of Y falls below 0.1% by weight, the desired effect of improving the high temperature charge properties cannot be expected. On the contrary, when the content of Y exceeds 5% by weight, the resulting battery shows a remarkable capacity drop.

The alkaline electrolyte to be used herein comprises lithium hydroxide and sodium hydroxide incorporated therein besides potassium hydroxide, which exhibits a high electrical conductivity, for the purpose of improving the charging efficiency.

The reason why the concentration of $Li^+$ is predetermined to range from not lower than 0.1 N to less than 1.0 N is that when the concentration of $Li^+$ falls below 0.1 N, the desired improvement of charging efficiency cannot be expected, and when the concentration of Li is 1.0 N or more, the depth of charging is too great.

The reason why the concentration of $Na^+$ is predetermined to range from 0.3 N to 1.5 N is that when the concentration of Na falls below 0.3 N, the desired improvement of charging efficiency cannot be expected, and when the concentration of Na exceeds 1.5 N, the resulting battery is subject to capacity drop.

The negative electrode to be used herein is prepared by a process which comprises applying a powder of cadmium oxide, if a nickel-cadmium battery is prepared, or a powder of hydrogen absorbing alloy, if a nickel hydride battery is prepared, to a nickel-plated iron substrate.

As the separator there is used a nonwoven fabric made of polyamide or hydrophilicized polyolefin.

The alkaline storage battery of the invention can be prepared, e.g., by a process which comprises spirally winding the positive electrode and the negative electrode with the separator provided interposed therebetween to prepare an electrode body, inserting the electrode body in an outer case, injecting the alkaline electrolyte into the outer can, and then sealing the outer can to obtain a cylindrical or rectangular battery.

Specific embodiments of implication of the present invention will be described hereinafter.

Experiment 1

The present experiment is intended to examine the relationship between the presence/absence of Y in the positive electrode and the content of Li in the electrolyte with respect to charge properties and discharge properties.

A sintered nickel substrate having a porosity of about 80% obtained by sintering a nickel substrate in a reducing atmosphere was dipped alternately in a 80° C. aqueous solution of nickel nitrate (specific gravity: 1.75) and a 80° C. 25% aqueous solution of sodium hydroxide so that it was filled with an active nickel hydroxide material to prepare a sintered nickel positive electrode. The positive electrode thus prepared will be hereinafter referred to as "ordinary positive electrode".

Subsequently, the ordinary positive electrode thus obtained was dipped in a yttrium nitrate-nickel (molar ratio:1:1) having a specific gravity of 1.30, dried at a temperature of 80° C. for 10 minutes, and then dipped in a 25% solution of sodium hydroxide to obtain a sintered positive electrode having yttrium hydroxide attached to the entire positive electrode including the substrate and active material. The positive electrode thus obtained will be hereinafter referred to as "Y-containing positive electrode".

The content of Y in the positive electrode was about 1% based on the weight of the positive electrode.

As a negative electrode there was used a metallic hydride ($MmNi_{3.2}COMn_{0.6}Al_{0.2}$) (molar ratio). Mm represents a mischmetal.

The positive electrode and negative electrode thus obtained were then spirally wound with a separator made of a nonwoven synthetic resin fabric provided interposed therebetween to obtain an electrode body. The electrode body thus obtained was then inserted in an outer can. An alkaline electrolyte was then injected into the outer can. The outer can was then sealed to prepare sample nickel hydride battery (nominal capacity: 6.5 Ah) Nos. 1 to 4 having an HR-D type (an R20 size). The kind of the positive electrodes used and the concentration of $K^+$, $Li^+$ and $Na^+$ in the alkaline electrolytes used are set forth in Table 1 below.

Sample Nos. 1 and 2 are comparative examples comprising a positive electrode free of Y. Sample No. 3 is a comparative example using an electrolyte having an Li concentration falling outside the range defined herein. Sample No. 4 is an example according to the invention.

TABLE 1

| Sample battery No. | Kind of positive electrode | Alkaline electrolyte | | |
|---|---|---|---|---|
| | | $K^+$ concentration | $Li^+$ concentration | $Na^+$ concentration |
| 1 | Ordinary positive electrode (free of Y) | 5 N | 2 N | 0.5 N |
| 2 | Ordinary positive electrode (free of Y) | 6 N | 1 N | 0.5 N |
| 3 | Y-containing positive electrode | 5 N | 2 N | 0.5 N |
| 4 | Y- | 6 N | 0.5 N | 0.5 N |

TABLE 1-continued

| Sample battery No. | Kind of positive electrode | Alkaline electrolyte | | |
|---|---|---|---|---|
| | | K$^+$ con-centration | Li$^+$ con-centration | Na$^+$ con-centration |
| | containing positive electrode | | | |

Sample battery Nos. 1 to 4 were each then subjected to charging and discharging, i.e., charged at 0.1 It for 16 hours (1 It=6.5 A) and then discharged at 1 It until the battery reached 1.0 V. These sample batteries were each then measured for capacity. Further, these batteries were each subjected to charging and discharging, i.e., charged at 0.5 It for 1.6 hours and then discharged at 0.5 It until the battery reached 1.0 V, at a temperature of 50° C. These sample batteries were each then measured for charging efficiency at a temperature of 50° C.

The results of measurement are set forth in Table 2. The charging efficiency was calculated according to the following equation:

% Charging efficiency=Measured discharge capacity/charge electricity×100

TABLE 2

| Sample battery | Battery capacity (mAh) | 50° C. charging efficiency (%) |
|---|---|---|
| No. 1 | 6,450 | 75.4 |
| No. 2 | 6,500 | 62.6 |
| No. 3 | 6,210 | 95.3 |
| No. 4 | 6,523 | 95.4 |

As can be seen in the foregoing results, Sample battery Nos. 3 and 4, which comprise a Y-containing positive electrode, exhibited a 50° C. charging efficiency as much as 95% or more, demonstrating the these sample batteries have excellent high temperature charge properties. In other words, these sample batteries have excellent high temperature charge properties regardless of which the concentration of Li is 0.5 N or 2 N. Sample battery No. 3, which comprise an electrolyte having an Li concentration of 2 N, showed a greater battery capacity drop than sample battery No. 4. This is presumably because sample battery No. 3 had a great depth of charging and thus underwent a deterioration of discharge properties.

Sample battery Nos. 1 and 2, which comprise an ordinary positive electrode free of Y, exhibited a poor 50° C. charging efficiency and deteriorated high temperature charge properties. Sample battery No. 2 comprised an electrolyte having a smaller Li concentration than Sample battery No. 1 and thus exhibited a poorer charging efficiency.

These results show that the attachment of Y to the substrate and active material of positive electrode and the optimization of Li$^+$ concentration makes it possible to obtain a battery excellent in both high temperature charge properties and discharge properties.

Experiment 2

The present experiment was intended to examine the optimum content of Li$^+$ in an electrolyte.

Sample batteries were prepared in the same manner as in Experiment 1 except that the concentration of Li$^+$ in the electrolyte was varied from 0 (zero) to 2 N with the concentration of K and Na in the electrolyte kept to 6 N and 0.5 N, respectively.

These sample batteries were each then examined for capacity and 50° C. charging efficiency in the same manner as in Example 1. The battery capacity is represented by the index based on 100 of the capacity determined when the Li$^+$ concentration is 0 N. The results are shown in FIG. 1.

As can be seen in FIG. 1, there is shown little change of 50° C. charging efficiency, demonstrating that 50° C. charging efficiency doesn't depend on the content of Li$^+$. This also demonstrates that the incorporation of Y causes Li$^+$ in the electrolyte to have less effect on the high temperature charge properties.

It can be also seen that when the content of Li$^+$ in the electrolyte is zero, the desired effect of Li$^+$ of improving the charge receiving properties, lowering the battery capacity, but when the content of Li$^+$ in the electrolyte is 0.1 N or more, an effect of improving the battery capacity can be exerted. However, when the concentration of Li$^+$ is 1 N or more, the battery capacity tends to decrease. It is presumably because when the content of Li$^+$ increases, the depth of charging increases, deteriorating the discharge properties.

Therefore, the concentration of Li is preferably as small as possible so far as the incorporation of Y makes it possible to obtain desired high temperature charge properties. This is intended to prevent the depth of charging from going too far.

Taking into account the results of Experiment 1 as well, it is more desirable that the concentration of Li$^+$ is 0.5 N or less.

Experiment 3

The present experiment was intended to determine the optimum content of Na in the electrolyte.

Sample batteries were prepared in the same manner as in Experiment 1 except that the concentration of Na$^+$ was varied from 0 (zero) to 2.5 N with the concentration of K$^+$ and Li$^+$ in the electrolyte kept to 6 N and 0.5 N, respectively.

These sample batteries were each then examined for capacity and 50° C. charging efficiency in the same manner as in Experiment 1. The battery capacity is represented by the index based on 100 of the capacity determined when the Na concentration is 0 N. The results are shown in FIG. 2.

Figure 2:
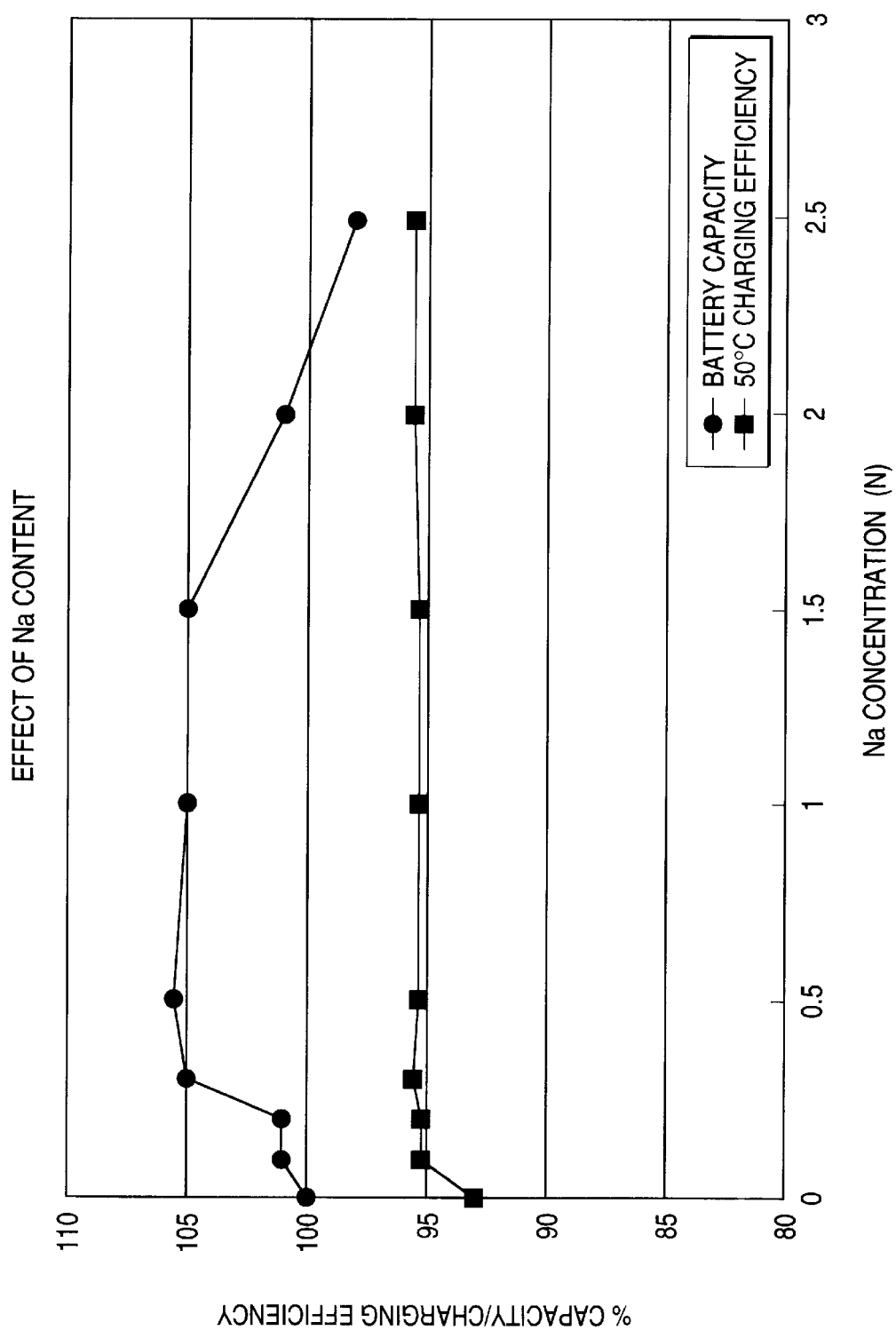
FIG. 2 is a graph illustrating the relationship between the concentration of $Na^\pm$ in an electrolyte and the capacity and 50° C. charging efficiency of a battery.

As can be seen in FIG. 2, these sample batteries show an almost constant 50° C. charging efficiency when the concentration of Na is 0.1 N or more. It can be seen also that these sample batteries show an excellent capacity when the concentration of Na falls within the range of from 0.3 N to 1.5 N. These results show that the optimum range of concentration of Na is from 0.3 N to 1.5 N.

Experiment 4

The present experiment was intended to examine the optimum content of Y in the positive electrode.

In Experiment 1, positive electrode plates were prepared with the concentration of yttrium nitrate varied. The amount of Y in the positive electrode was then measured to determine the weight percentage of Y based on the weight of the positive electrode. Also in these electrode plates, Y is present in the form of yttrium hydroxide. Sample batteries were prepared in the same manner as in Experiment 1 except that the concentration of, K$^+$, Li$^+$ and Na$^+$ in the electrolyte were kept to 6 N, 0.5 N and 0.5 N, respectively.

These sample batteries were each then examined for capacity and 50° C. charging efficiency in the same manner as in Experiment 1. The battery capacity is represented by the index based on 100 of the capacity determined when the content of Y is zero (when the positive electrode is totally free of Y). The results are shown in FIG. 3.

Figure 3:
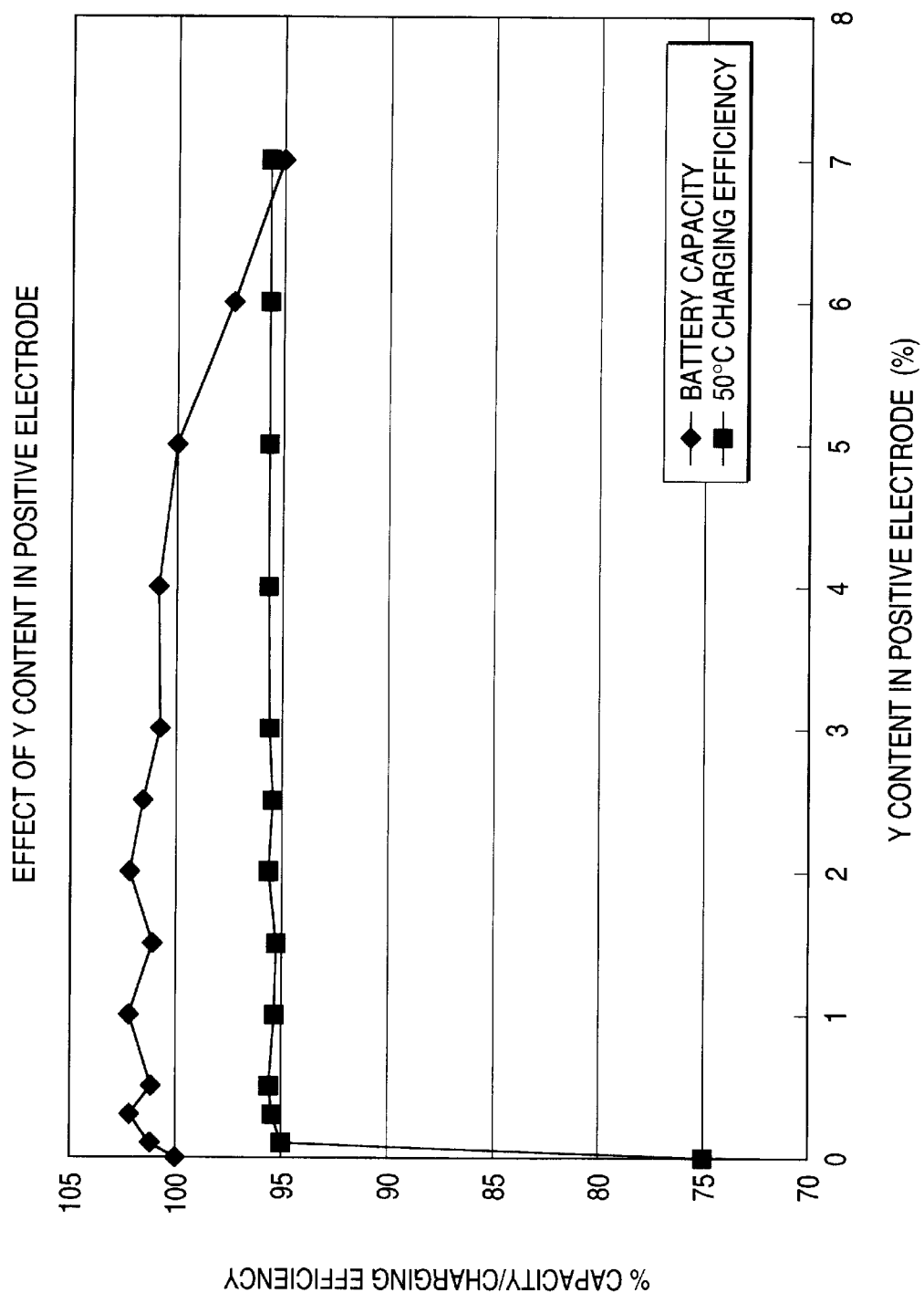
FIG. 3 is a graph illustrating the relationship between the content of Y in a sintered positive electrode and the capacity and 50° C. charging efficiency of a battery.

As can be seen in FIG. 3, these sample batteries exhibit an almost constant 50° C. charging efficiency when the content of Y is 0.1% by weight or more. In other words, when the content of Y in the positive electrode is 0.1% or more, sufficient high temperature charge properties can be obtained.

These sample batteries exhibit good capacity when the content of Y in the positive electrode ranges from 0 to 5% by weight. A preferred range of the content of Y is from 0.1 to 2.5% by weight. When the content of Y exceeds 5%, the drop of battery capacity becomes remarkable.

These results show that the content of Y in the positive electrode is preferably from 0.1 to 5% by weight, more preferably from 0.1 to 2.5% by weight based on the weight of the positive electrode.

As mentioned above, when Y is incorporated in the entire positive electrode including an electrode plate and an active material and the content of Li in the electrolyte is restricted, an alkaline storage battery excellent in both high temperature charge properties and discharge properties can be obtained.

While the invention has been described in detail and with reference to specific embodiments thereof, it will be apparent to one skilled in the art that various changes and modifications can be made therein without departing from the spirit and scope thereof.

What is claimed is:

1. An alkaline storage battery comprising:
   a sintered nickel electrode comprising a substrate and an active positive electrode material containing nickel hydroxide as a main component; an alkaline electrolyte containing at least $Li^+$ and $Na^+$, wherein said positive electrode contains Y and/or Y compound disposed on both a surface of said active material and a surface of the substrate of the sintered nickel electrode,
   wherein said alkaline electrolyte has an $Li^+$ content of from not lower than 0.1 to less than 1.0 N and an $Na^+$ content of from 0.3 to 1.5 N.

2. The alkaline storage battery according to claim 1, wherein said sintered nickel electrode is formed by filling a porous sintered Ni substrate with an active positive electrode material mainly composed of nickel hydroxide.

3. The alkaline storage battery according to claim 2, wherein said sintered nickel electrode is prepared by filling a porous sintered Ni substrate with an active material containing nickel hydroxide, dipping said substrate in a mixed salt solution containing Y to subject, said substrate to alkali treatment so that Y is present in the form of yttrium hydroxide.

4. The alkaline storage battery according to claim 1, wherein the content of Y in said sintered nickel electrode is from 0.1 to 5% based on the weight of said sintered nickel electrode.

5. The alkaline storage battery according to claim 1, wherein the concentration of $Li^+$ is 0.5 N or less.

6. The alkaline storage battery according to claim 4, wherein the content of Y in said sintered nickel electrode is from 0.1 to 2.5% based on the weight of said sintered nickel electrode.

7. A process for the preparation of an alkaline storage battery comprising sintered nickel electrode containing nickel hydroxide as a main component and an electrolyte containing at least $Li^+$ and $Na^+$, wherein said sintered nickel electrode is formed by a process which comprises a dipping step of dipping a sintered nickel electrode in a salt containing yttrium and nickel so that it is filled with yttrium and an activating step of dipping said electrode in an aqueous alkaline solution.

8. A nickel-hydride battery comprising:
   a sintered nickel electrode comprising a substrate and an active positive electrode material containing nickel hydroxide as a main component;
   an alkaline electrolyte containing at least $Li^+$ and $Na^+$; and
   Y and/or Y compound disposed on both a surface of said active material and a surface of the substrate of the sintered nickel electrode,
   wherein said alkaline electrolyte has an $Li^+$ content of from not lower than 0.1 to less than 1.0 N and an $Na^+$ content of from 0.3 to 1.5 N.

* * * * *